United States Patent
Bormioli

(10) Patent No.: US 9,353,869 B2
(45) Date of Patent: May 31, 2016

(54) PETAL CONTROL VALVE WITH SEALING GASKET FOR SEPARABLE CONNECTION UNITS FOR FLEXIBLE HOSES

(71) Applicant: MIB Italiana S.P.A., Casalserugo PD (IT)

(72) Inventor: Lorenzo Bormioli, Padua (IT)

(73) Assignee: MIB ITALIANA S.P.A., Casalserugo PD (IT)

( * ) Notice: Subject to any disclaimer, the term of this patent is extended or adjusted under 35 U.S.C. 154(b) by 39 days.

(21) Appl. No.: 14/396,264

(22) PCT Filed: Apr. 24, 2013

(86) PCT No.: PCT/IB2013/053233
§ 371 (c)(1),
(2) Date: Oct. 22, 2014

(87) PCT Pub. No.: WO2013/160843
PCT Pub. Date: Oct. 31, 2013

(65) Prior Publication Data
US 2015/0115187 A1    Apr. 30, 2015

(30) Foreign Application Priority Data

Apr. 26, 2012 (IT) .............................. MI2012A0694

(51) Int. Cl.
*F16K 1/46* (2006.01)
*F16K 1/16* (2006.01)
*F16L 55/10* (2006.01)

(52) U.S. Cl.
CPC . *F16K 1/165* (2013.01); *F16K 1/46* (2013.01); *F16L 55/1007* (2013.01); *F16L 55/1018* (2013.01)

(58) Field of Classification Search
CPC ..... F16K 3/10; Y10T 137/1624; E21B 33/06; E21B 33/061; E21B 33/064
USPC .......... 251/357–360, 364; 277/326, 344, 403, 277/496, 498, 631, 637
See application file for complete search history.

(56) References Cited

U.S. PATENT DOCUMENTS 3,887,158 A * 6/1975 Polk ............................... 251/1.1
4,067,540 A * 1/1978 Slade ........................... 251/63.4

(Continued)

FOREIGN PATENT DOCUMENTS

IT    MI20092146 A1    6/2011
IT    MI20102248 A1    6/2012

(Continued)

*Primary Examiner* — Matthew W Jellett
(74) *Attorney, Agent, or Firm* — Jacobson Holman, PLLC.

(57) ABSTRACT

A control valve for connection units for flexible hoses comprises a plurality of petals rotatable between a position of complete opening and a position of complete closing, wherein rotatable petals of different shape and sizes alternate in pairs along the circumference of the connection unit. The petals of smaller size have a substantially triangular shape with straight lateral sides and a rounded end which fluid-tightly abut against corresponding straight lateral, sides and curved parts of the petals of larger size when the valve is closed.

5 Claims, 13 Drawing Sheets

(56) References Cited

U.S. PATENT DOCUMENTS

| | | | |
|---|---|---|---|
| 4,326,555 A | | 4/1982 | Thomson |
| 4,915,395 A | * | 4/1990 | Barteck .......................... 277/637 |
| 5,273,071 A | * | 12/1993 | Oberrecht ................ 137/614.06 |
| 5,579,718 A | * | 12/1996 | Freerks ......................... 118/733 |
| 6,375,155 B1 | * | 4/2002 | Janssens ....................... 251/212 |
| 6,932,354 B2 | * | 8/2005 | Kane et al. ................... 277/608 |
| 8,998,171 B2 | * | 4/2015 | Bormioli .................... 251/149.2 |
| 2006/0097461 A1 | * | 5/2006 | Tsuji et al. ................... 277/637 |

FOREIGN PATENT DOCUMENTS

| | | |
|---|---|---|
| WO | 2012/076240 A1 | 6/2012 |
| WO | 2012/076242 A1 | 6/2012 |

* cited by examiner

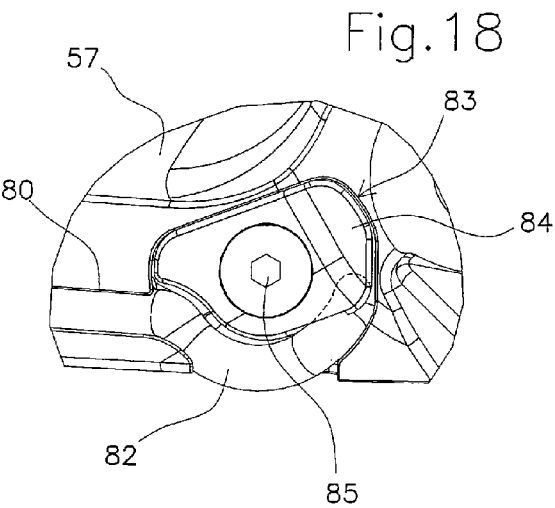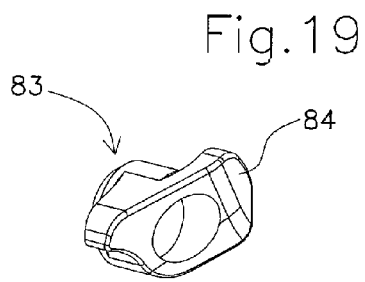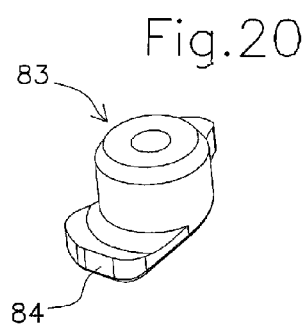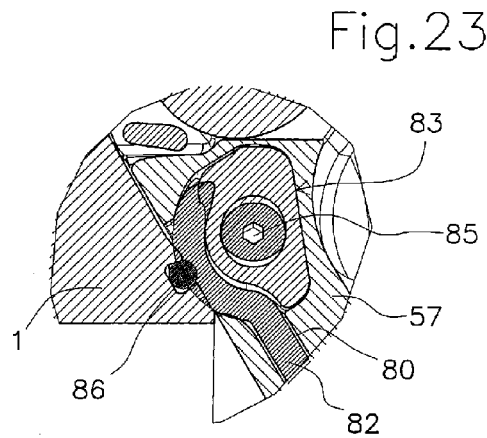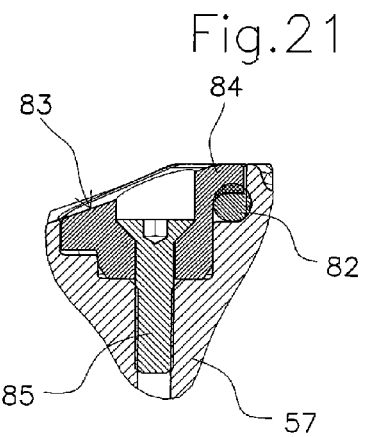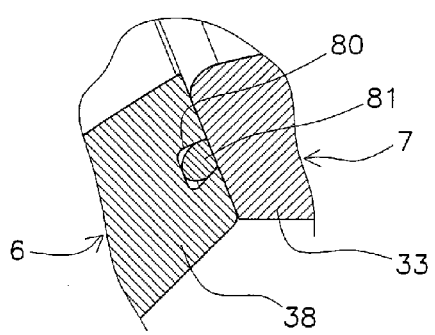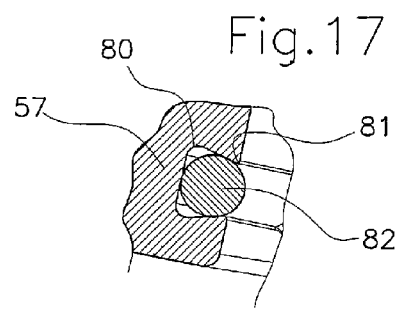

PETAL CONTROL VALVE WITH SEALING GASKET FOR SEPARABLE CONNECTION UNITS FOR FLEXIBLE HOSES

The present invention relates to a petal control valve for separable connection units for hoses for transferring fluid products, in particular petroleum products.

It is known that sea transfer of petroleum products from petrochemical installation, from platform, from tanker to tanker, from tanker to land installation and vice versa is carried out through flexible hoses and connection units which consist of two separable parts, each provided with a respective control valve which automatically closes upon separation to limit the spillage of product into the sea, with consequent less pollution of the latter. These connection units are placed on the part of the flexible hose positioned in the sea and have the primary objective of protecting the hose, and more in general the connection line, in case of abnormal situations which cause excessive pulling on the hose or excessive pressure on the line. Such abnormal situations may be breaking away and drifting off of tankers or more in general petroleum installations (FPSO) thus stretching the flexible hose, rough sea causing traction on the hose beyond the limits, boat knocking into the hose and draping it away thus creating excessive loads thereon, quick closing of the valve downstream of the flow or any other reason causing excessive axial load and/or pressure increase.

The currently available connection units are made so that the control valves are automatically closed after the separation of the two parts of the connection unit, i.e., without control by an operator in the aforesaid situations.

Fluid control valves of the petal type are also known, i.e. consisting of a plurality of rotatable segments or sectors, which are rotated between an opening position, in which the petals are substantially parallel to the flow direction of the petroleum product, and a closing position in which the petals converge transversally to the axis of the unit to block the product flow. The movement from the opening position to the closing position occurs under the bias of elastic means when the retaining action exerted, for example, by an axially removable inner sleeve ceases due to the axial traction stress imposed on the connection unit. Fluid dynamic brakes appropriately slow down the closing speed of the upstream valve to avoid excessive pressure, called water hammer, determined by the combined action of the elastic means and of the pressurized fluid, which may have destructive effects on the control valve and on the connection unit itself.

A particular petal control valve is described in Italian patent application MI2010A002248, filed on 6 Dec. 2010, and comprises rotatable petals (or segments or sectors) of different shape and sizes which alternate in pairs along the circumference of the connection unit, and if used for the upstream control valve in the fluid flow direction, are controlled so that the smaller sectors close more slowly than the larger ones.

Thereby, the water hammer and the corresponding harmful effects for installation can be avoided during the closing process by appropriately choosing the shape and sizes of the petals and by appropriately adjusting the fluid dynamic brakes.

In order to obtain a perfectly tight closing of such a control valve, the edges of the petals must gradually approach during the step of closing up to reach the fully coinciding condition of the edges which does not allow the leakage of the fluid product between one edge and the other.

For this purpose, as described in the above-mentioned patent application, the petals of larger size have a substantially triangular shape with a V-shaped end, the sides of which are intended to fluid-tightly abut against the corresponding sides of the V-shaped ends of adjacent petals of larger size, and also have straight lateral sides with a curved part provided with a laterally protruding curved step. The petals of smaller size have in turn a substantially triangular shape with a rounded end which overlaps said curved step of the adjacent petals of larger size when the valve is closed, and laterally tightly engages said curved part of the adjacent petals of larger size, and straight lateral sides which tightly engage the straight lateral sides of the adjacent petals of larger size when the valve is closed.

Despite the care devoted to shaping the two types of petals, it has been found that obtaining the perfectly tight coupling of the edges of adjacent petals is very difficult.

Therefore, it is the object of the present invention to provide a device capable of ensuring perfect tightness between one petal and the next one when the valve is closed.

In accordance with the invention, such an object was achieved by obtaining, in the lateral sides and the rounded end of the petals of smaller size, a continuous cavity with a dovetail cross-section and small lateral entrance in which a sealing gasket with a substantially circular cross-section and ends fixed in a removable manner to the remote ends of the lateral sides is housed and retained.

The fixing points of the ends of the sealing gasket are preferably arranged near the pivoting points of the petal, so that they can cooperate with sealing rings provided on the body of the connection unit for also ensuring the sealing against possible lateral leakages of product from the interior to the exterior of the connection unit.

The cavity housing the sealing gasket extends along an inclined surface of the petal which is contacted by a cooperating inclined surface of the adjacent petal. Thereby, the approaching movement of the side edges of the petals during the step of closing determines a much higher thrust of the sealing gasket towards the interior of the cavity than the thrust which close the petals to obtain a greater retaining safety and operational efficacy of the sealing gasket, further requiring a spring with a lower load, which is consequently smaller.

The features of the present invention will become further apparent from the following detailed description of an embodiment thereof, shown by way of non-limitative example in the accompanying drawings, in which:

FIGS. 1 and 2 respectively show a side view and an axial section view, taken along line 1141 in FIG. 1, of the connection unit for flexible hoses with petal control valves according to the present invention;

FIGS. 17-23 show details related to the positioning and operation of the sealing gasket with which the petals of smaller size are provided.

The two parts 1 and 2 are connected by burst screws 3, which break in case of strong traction stress (equal to or higher than the setting load), thus allowing to separate the two parts.

A cylindrical sliding sleeve 4 (FIG. 2) is arranged within the connection unit, which sleeve is automatically and axially removable from the connection unit when the two parts of the unit are separated.

The cylindrical sleeve 4 keeps the normally open position of two rotatable sector valves 5-5' placed upstream and downstream in the flow direction of the petroleum product, respectively.

The functions and operative modes of the sleeve 4 are described, for example, in Italian patent application MI2009A002146 filed on 4 Dec. 2009 by the Applicant.

Figure 1:
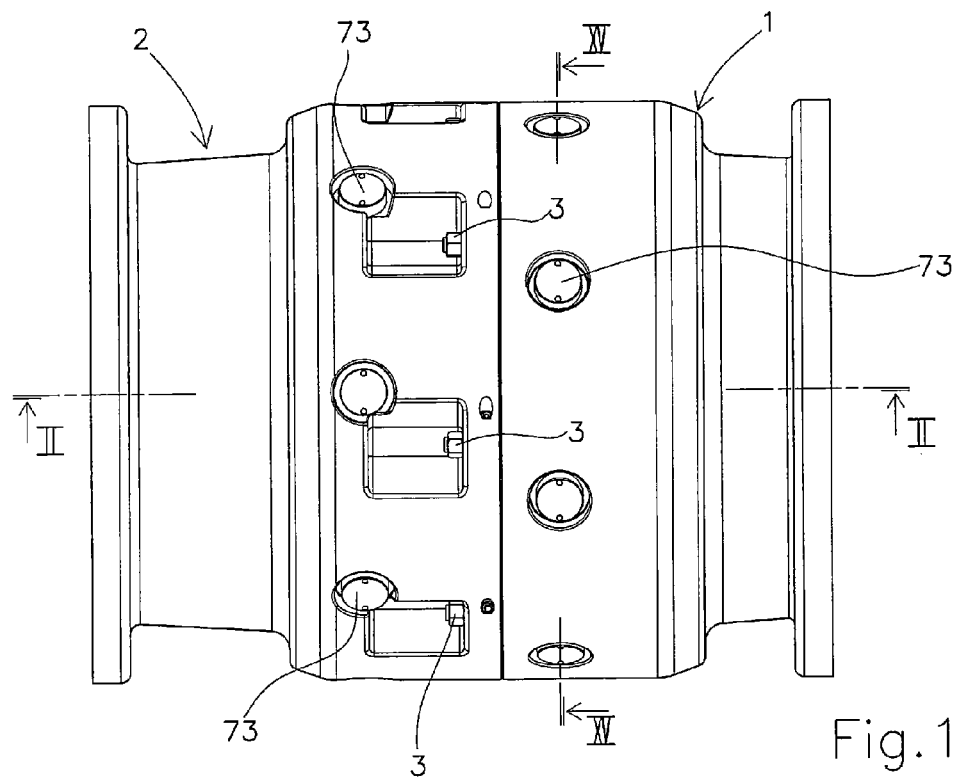
FIG. 1 shows a connection unit for flexible hoses, which comprises two separable valve parts or bodies 1 and 2, upstream and downstream in the flow direction of the transported fluid product indicated by arrow F in FIG. 2, respectively.
Figure 2:
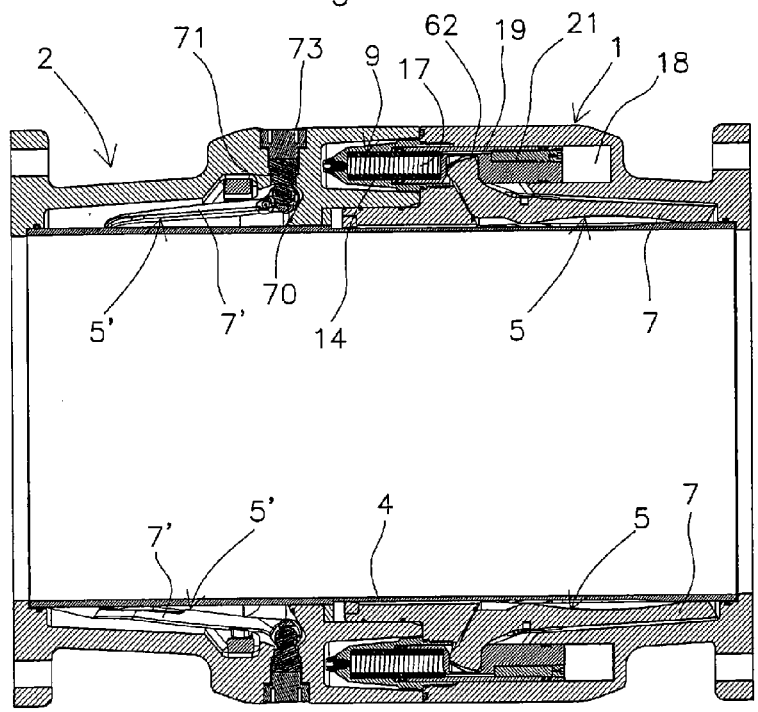
Figure 3:
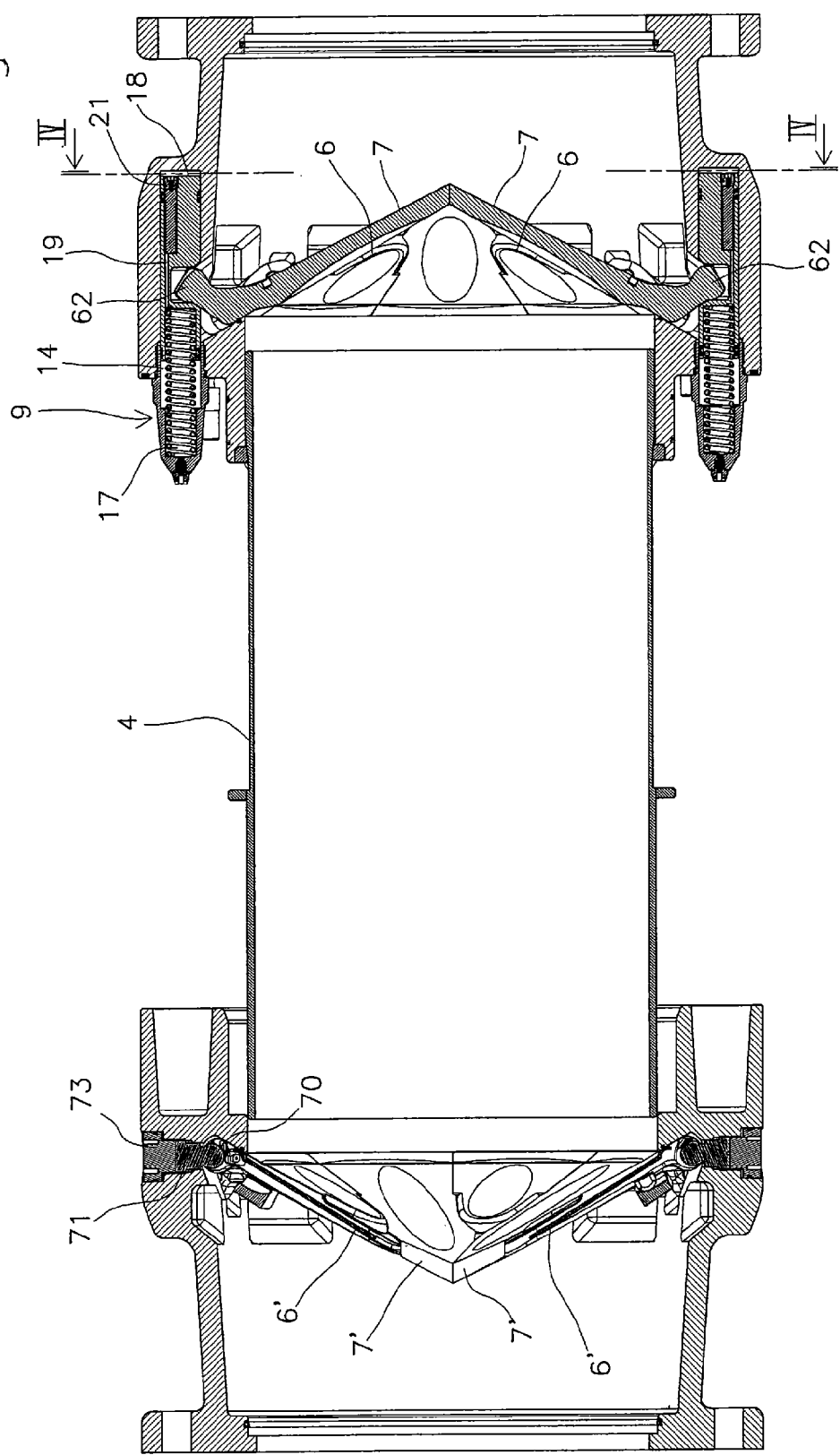
FIG. 3 shows an axial section view of the same connection unit during a two-parts separating process with the control valves already closed.
Figure 4:
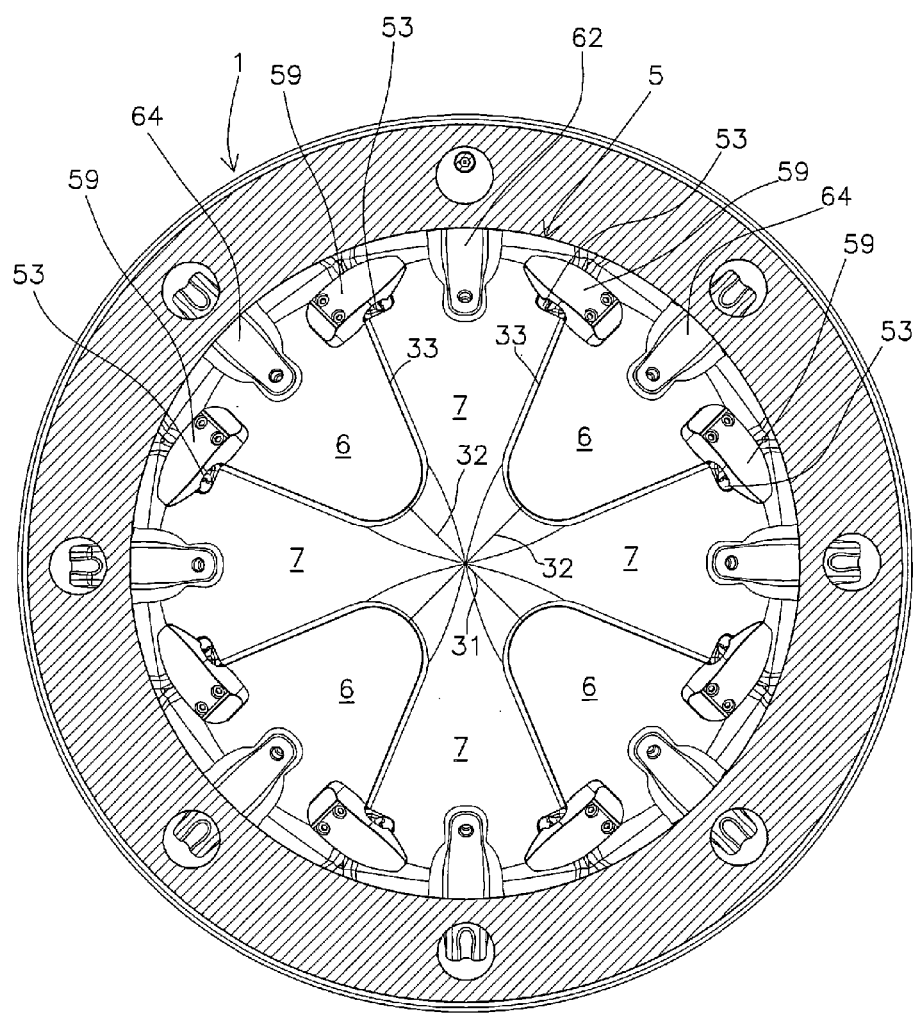
FIG. 4 shows a section view of the connection unit taken along line IV-IV in FIG. 3.
Figure 5:
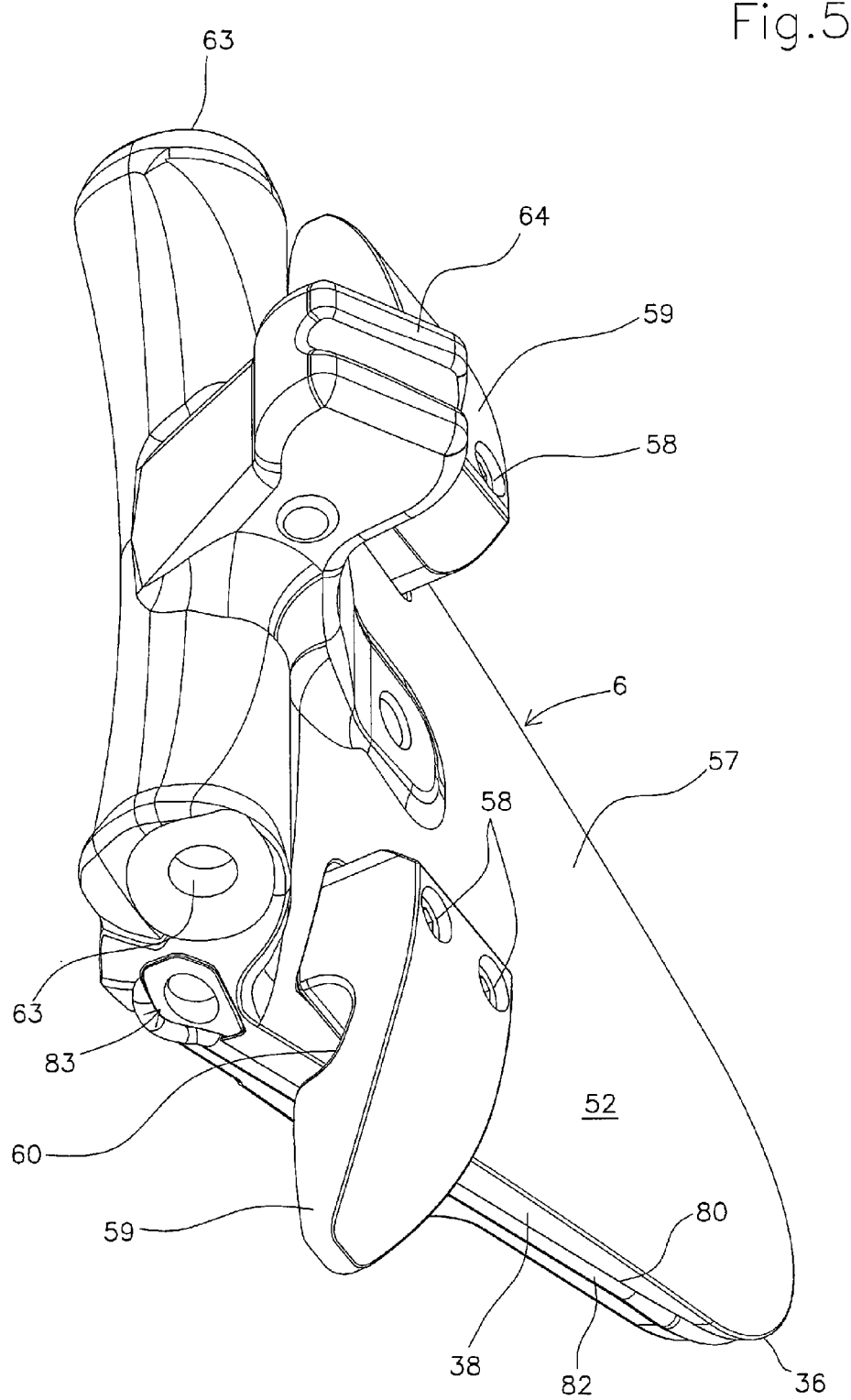
FIG. 5 shows by way of example a perspective view of one of the petals of smaller size of the control valve which is upstream in the flow direction of the fluid product.
Figure 6:
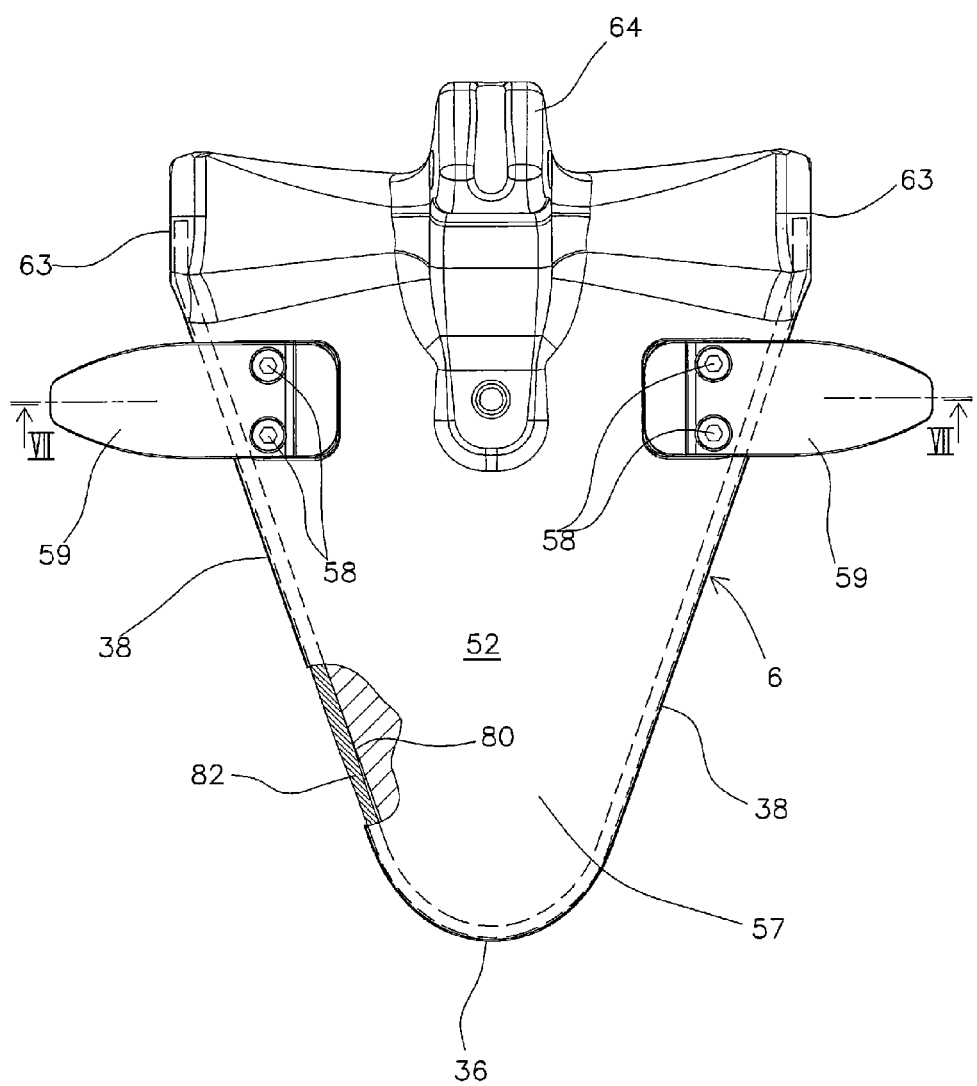
FIG. 6 shows a plan view of the same petal.
Figure 7:
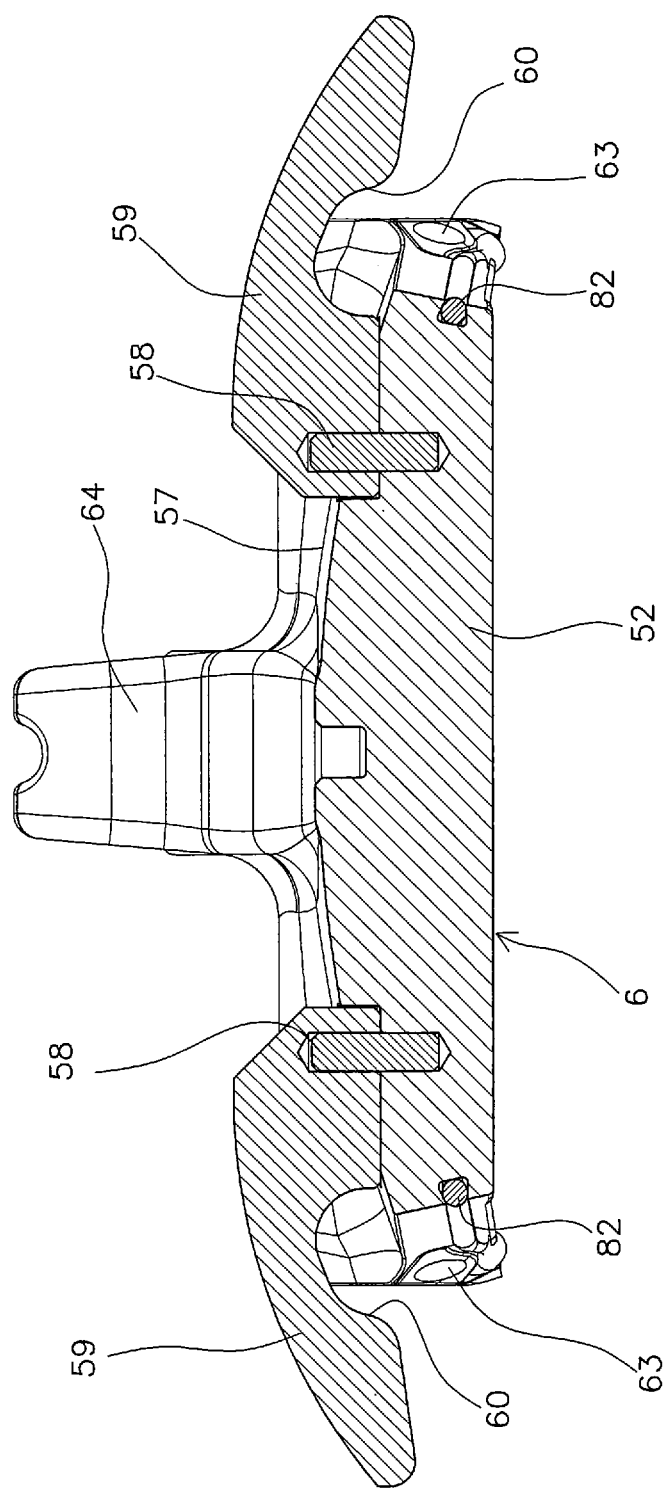
FIG. 7 shows a section view of the same petal taken along line VII-VII in FIG. 6.
Figure 8:
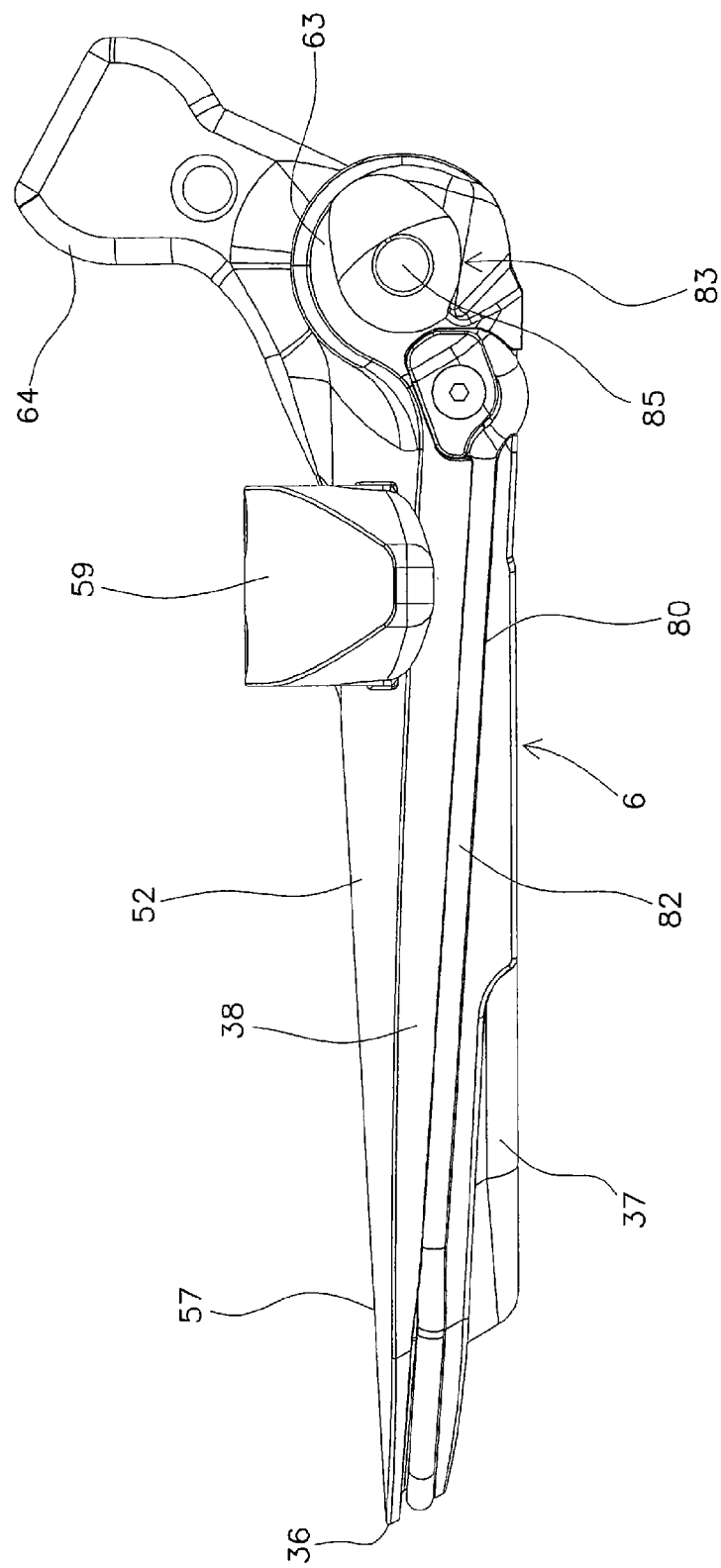
FIG. 8 shows a side view of the same petal.
Figure 9:
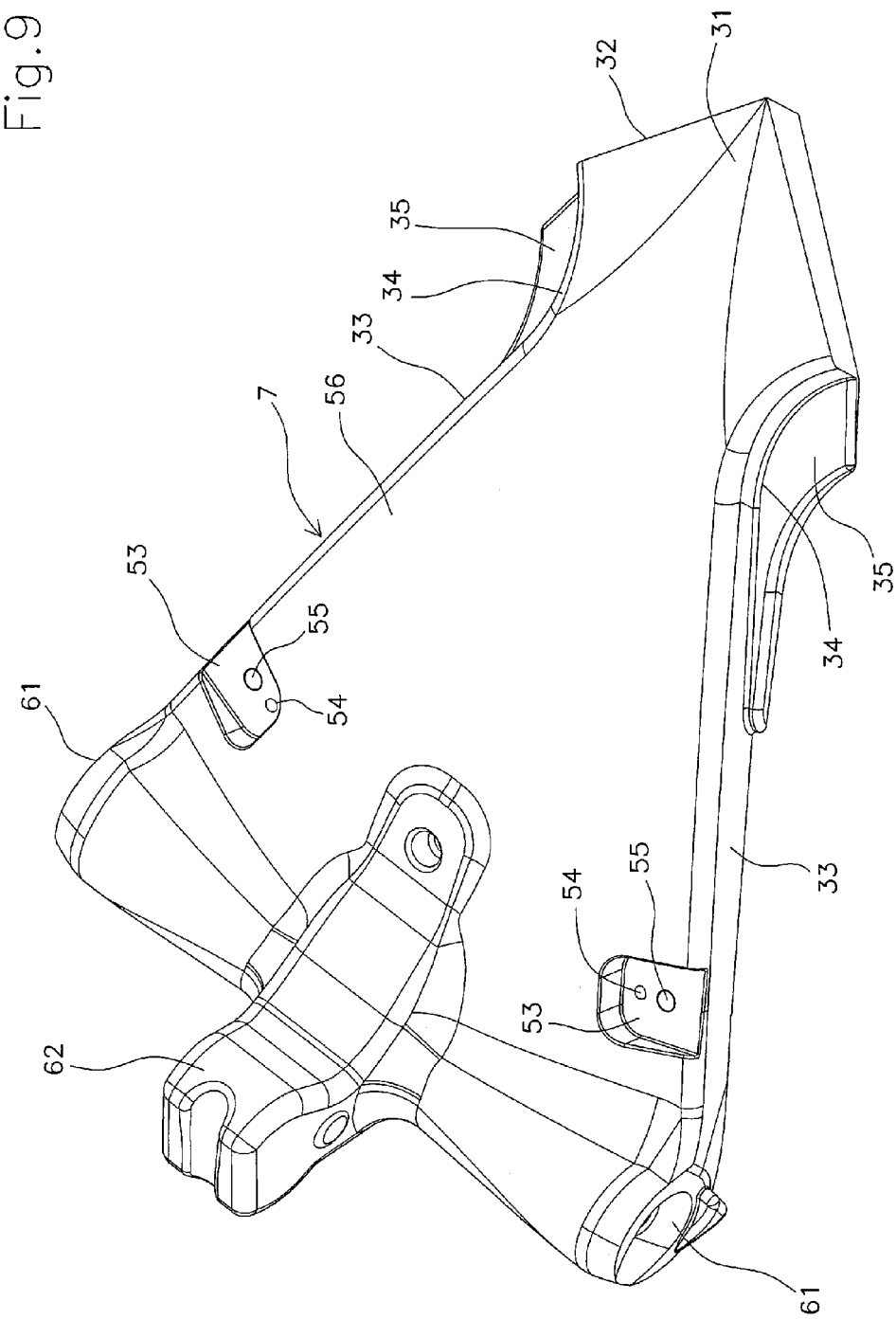
FIG. 9 shows by way of example a perspective view of one of the petals of larger size of the control valve which is upstream in the flow direction of the petroleum product.
Figure 10:
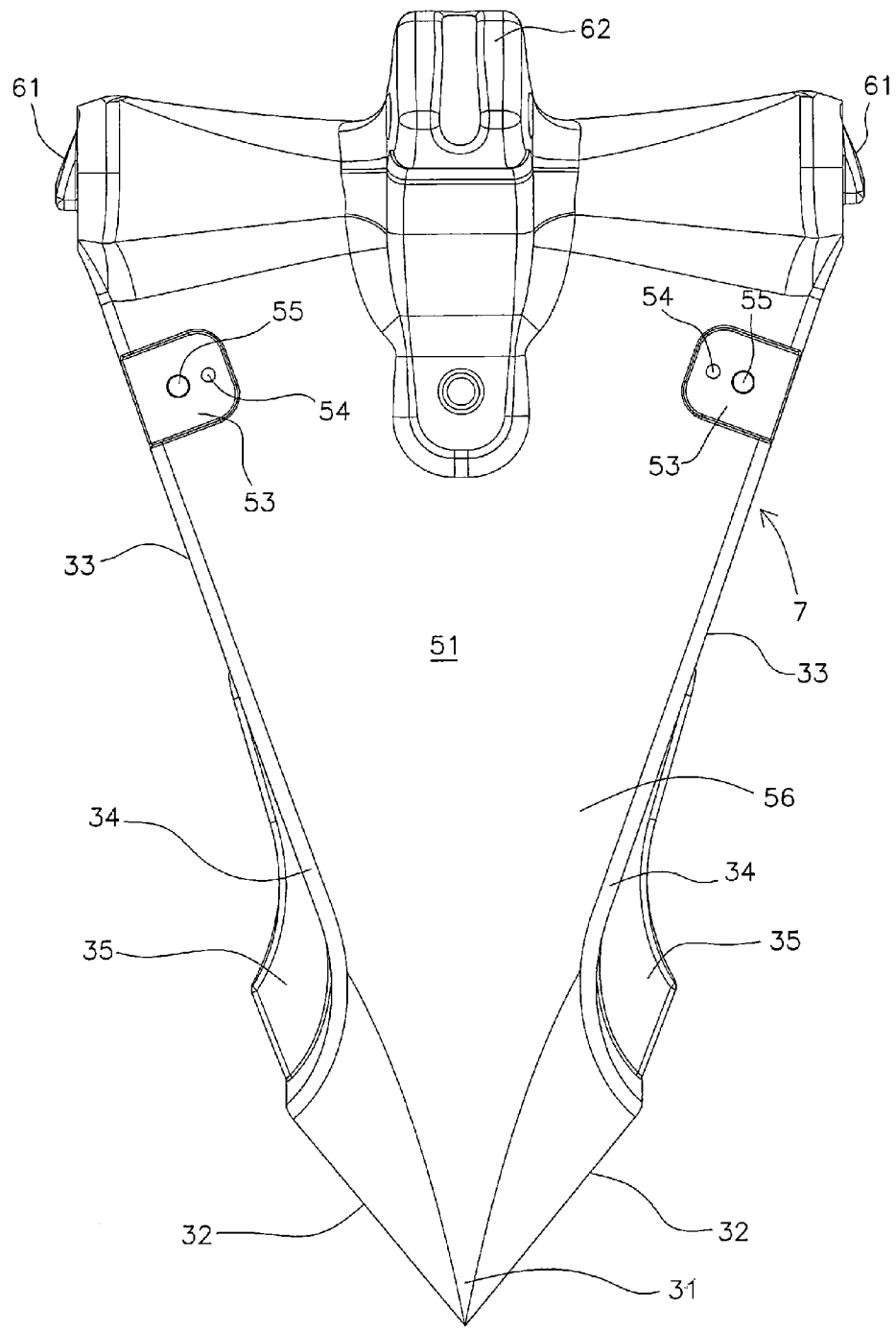
FIG. 10 shows a plan view of the same petal in FIG. 9.
Figure 11:
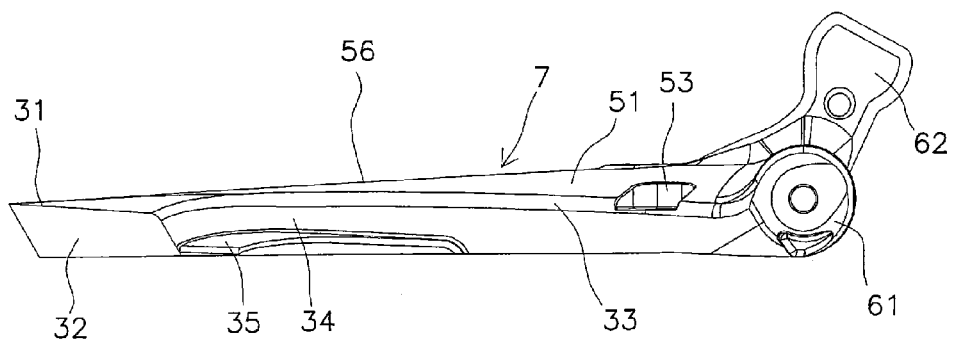
FIG. 11 shows a side view of the same petal in FIG. 9.
Figure 12:
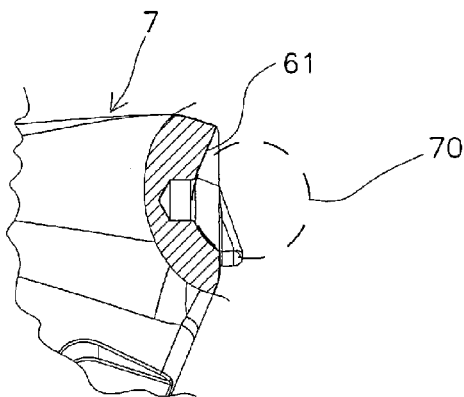
FIGS. 12-13 show a partially sectioned view of the housing seats of the spherical pins with which the petals in FIGS. 5-8 and 9-11 are provided.
Figure 13:
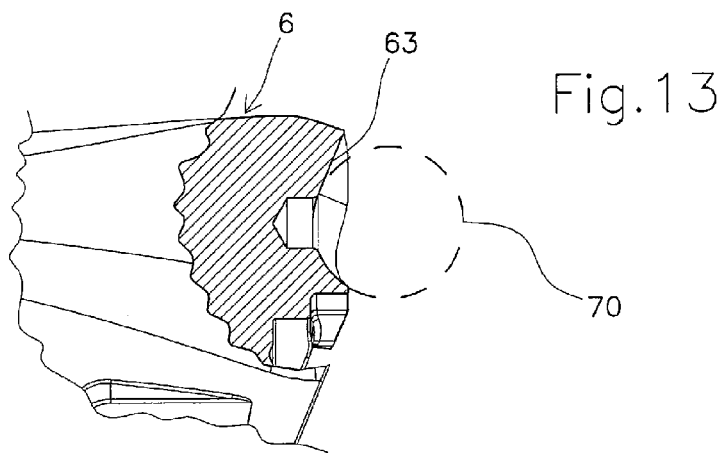

Each valve 5-5' consists of two series of petals or segments 6-7 and 6'-7' of different shape and sizes, which alternate circumferentially and are rotatable about respective axes 8-8' between the opening position in FIG. 2 and the closing position in FIGS. 3 and 4.

FIGS. 5-14 show in detail, again by way of example, the shape and function of the petals 6 and 7 of the upstream control valve 5, made in accordance with the present invention. This also applies to petals 6' and 7' of the downstream control valve 5'.

A petal 7 of larger size is shown in FIGS. 9-13, where it is seen consisting of an approximately triangular body 51 which is provided with a V-shaped end 31, the sides 32 of which are intended to fluid tightly abut against the corresponding sides of the other adjacent petals 7. Petal 7 has lateral sides 33 with a curved end 34, from which a curved step 35 laterally extends, on which a side of the petal 6 of smaller size interposed between two petals 7 of larger size rests when the valve is closed. Two oblique projections 53 overlap and are integral (or restrained at fixing points 54 and 55) to the upstream surface 56 of body 51 which faces the flow of petroleum product when the valve is closed. Petal 7 also includes partially spherical pivoting points 61 (shown in greater detail in FIG. 13) and a control heel 62.

A petal 6 of smaller size is shown, in turn, in FIGS. 5-8, where it is seen consisting of an approximately triangular body 52 which is provided with a rounded end 36 with step 37 (FIG. 8), which tightly engages the curved parts 34 of two adjacent petals 7 when valve 5 is closed, and with straight sides 38 which tightly engage the lateral sides 33 of the two adjacent petals 7 when valve 5 is closed. Two fins 59, which laterally protrude from the sides 38 and are provided with curved recesses 60 adapted to house, when the valve is closed, the corresponding projections 53 of the adjacent petals 7 (as shown in greater detail below), overlap and are restrained at fixing points 58 to the upstream surface 57 of the body 52. Petal 6 also includes partially spherical pivoting points 63 (shown in greater detail in FIG. 12) and a control heel 64.

Petal 6 is provided with a cavity 80 which extends continuously along the rounded end 36 and the straight lateral sides 38 of the petal body (FIGS. 5, 6 and 8), and as shown by the magnified detail in FIG. 17, has a dovetail cross-section with a small entrance 81. A sealing gasket 82 (typically a circular section O-ring) is housed and retained within cavity 80, the ends of the sealing gasket being fixed to the remote ends of the petal sides 38, near the pivoting seats 63, by means of locking plates 83 which have a laterally protruding knurled shoulder 84 overlapping the end of the sealing gasket 82 and pressed on the shoulder by means of a screw 85. The details of a fixing point of one end of sealing gasket 82 and of a plate 83 are shown in FIGS. 18-21.

FIG. 22 shows in turn that the entrance to cavity 80 is obtained on an inclined plane of the lateral side 38 of petal 6, which mates with a corresponding inclined plane of the lateral side 33 of the adjacent petal 7 when the valve is closed. This determines, immediately before the completion of the closing movement and then when the valve is closed, a crosswise thrust of petal 7 on the sealing gasket 82 which tends to push and maintain the sealing gasket 82 within the cavity for a greater retaining safety and operational efficacy of the sealing gasket.

Finally, FIG. 23 shows that the end of sealing gasket 82 cooperates with a sealing ring 86 (typically a rubber O-ring) provided in the body of the connection unit so as to avoid leakage of product from the interior to the exterior of the connection unit.

Similarly, the petals 6' of control valve 5', entirely identical to the petals 6 of valve 5, also include a cavity and a sealing gasket like those described and indicated by 80 and 82 for the petals 6 of control valve 5, and therefore we believe that repeating the description is not necessary.

Figure 14:
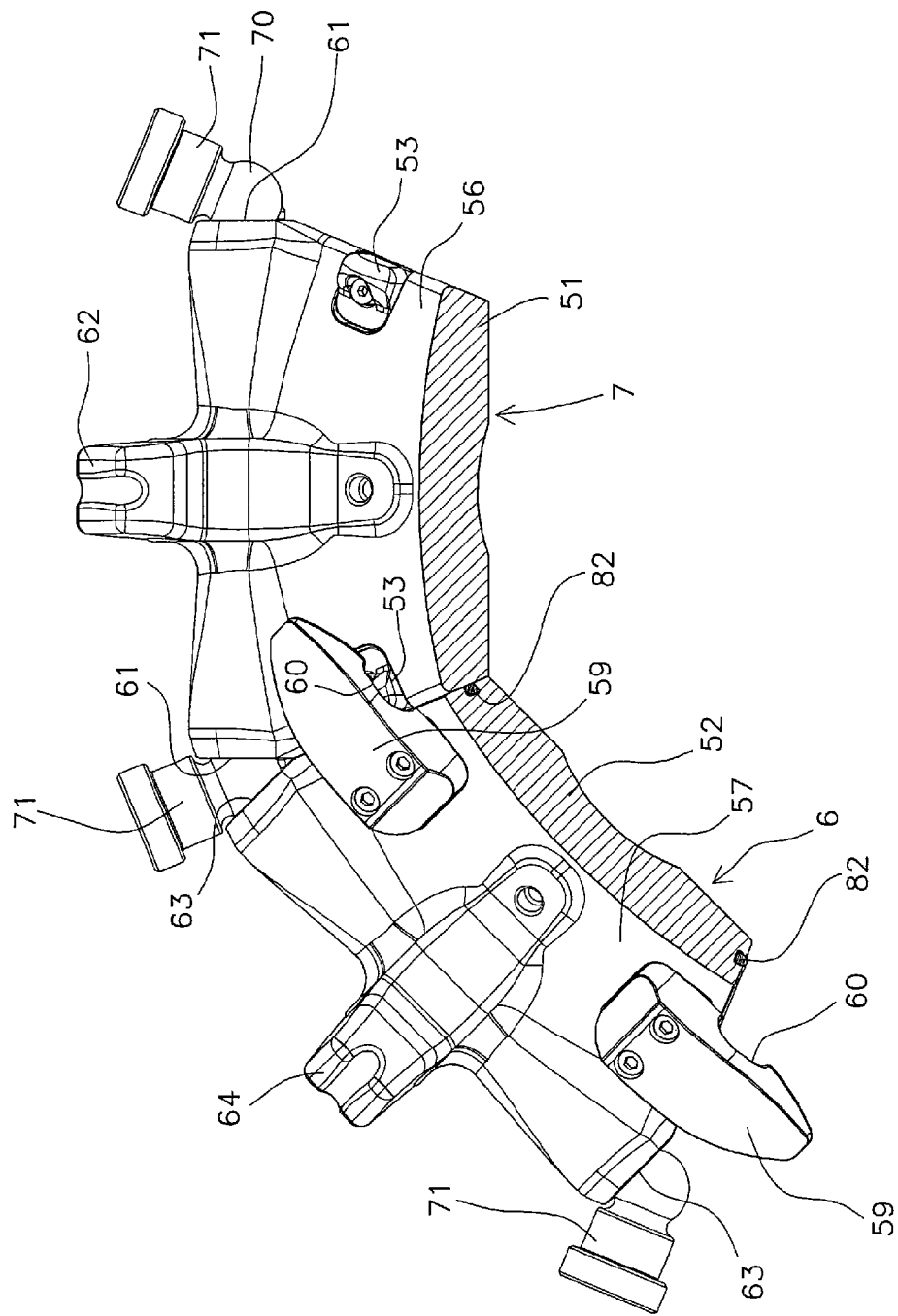
FIG. 14 shows how a petal of smaller size overlaps a petal of larger size in the closing position of the valve to which said petals belong.
Figure 15:
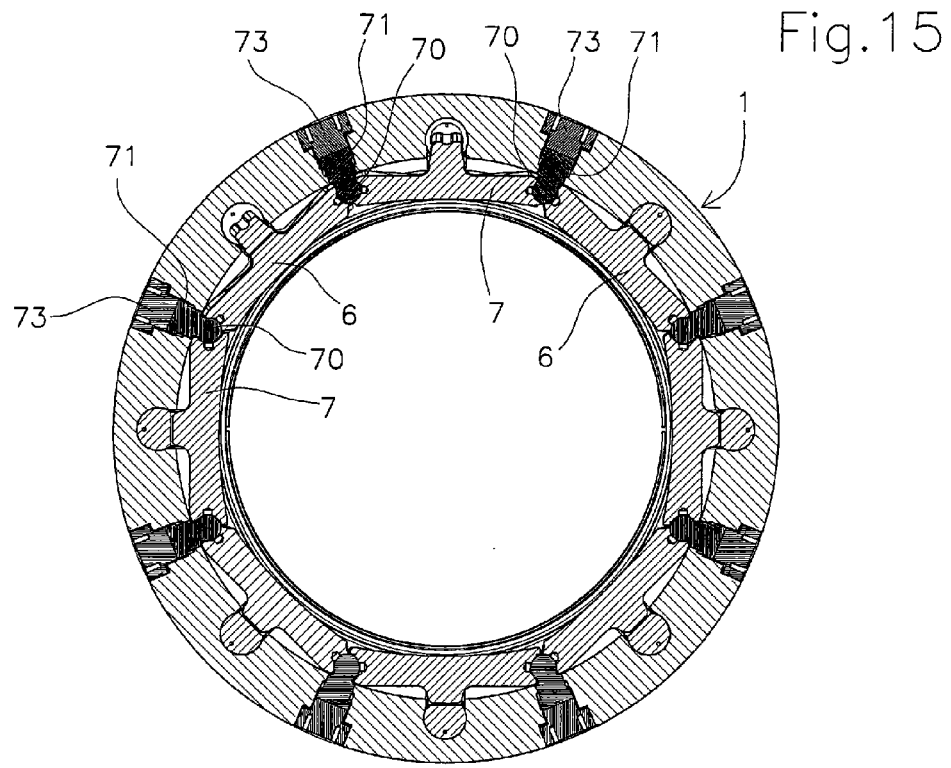
FIG. 15 shows a cross-section view of the connection unit through the pivoting points of the petals according to line XV-XV in FIG. 1.
Figure 16:
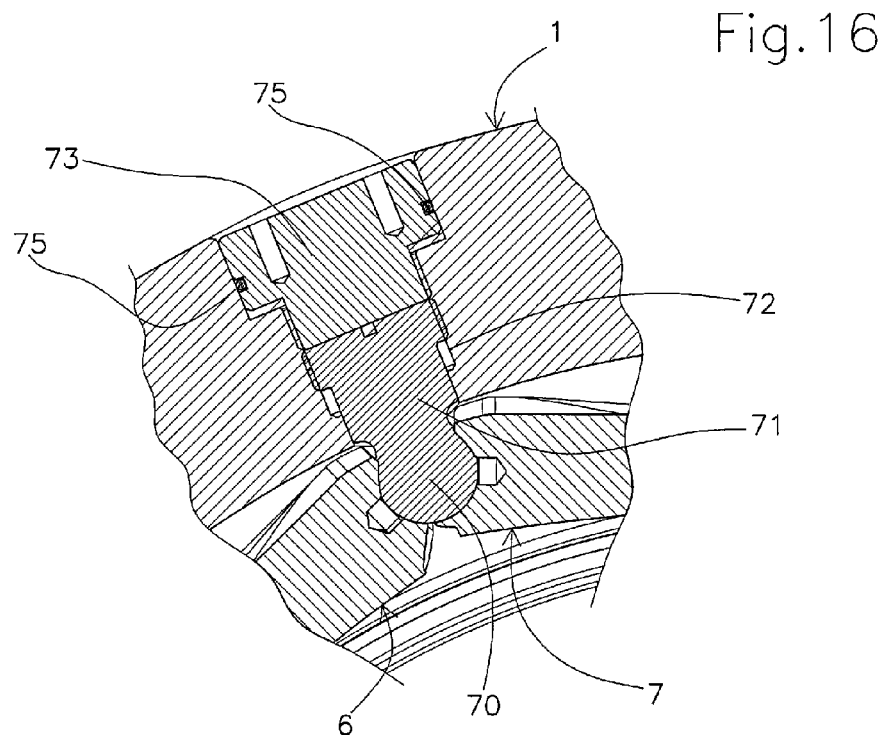
FIG. 16 shows an enlarged detail of one of the pivoting points shown in FIG. 15.

Petals 7 and 6 can rotate about respective axes and pivoted to one another by means of spherical pins 70, shown in FIGS. 14, 15 and 16, which are rotationally housed in the partially spherical seats 61 and 63 of the aforesaid petals. Each spherical pin 70 is provided with a threaded positioning neck 71 (FIG. 16) which is inserted and screwed into a respective radial hole 72 of the body of the connection unit. A locking cap 73 is screwed into the same hole 72 and acts on the neck 71 to keep the spherical pin 70 in the correct position. A sealing gasket 75 is interposed between the lateral surfaces of cap 73 and hole 72 to avoid leakages of fluid through the pivoting points.

Similar spherical pins 70 with neck 71 and locking cap 73 are provided for the petals of control valve 5', as shown in FIGS. 2 and 3.

FIGS. 4 and 14 show the closing configuration of the petals 7 and 6 of the control valve 5. The same applies to valve 5'.

The movement of the single petals 7 and 6 from the opening position to the closing position is controlled by an automatic closing device 9 of the type described in Italian patent application MI2010A002248, filed on 6 Dec. 2010, which acts on the heels 62 and 64 under the bias of helical springs 17 when sleeve 4, according to the modes explained in Italian patent MI2009A002146, is axially pulled out from the interior of valve 5, thus ceasing the retaining action of the rotatable petals 6 and 7 of the valve itself The closing movement of the petals 7 and 6 of valve 5 is braked by the controlled leakage of a braking fluid of the viscous type from the housing chambers 18 of the fluid itself to the housing chambers 14 of the springs 17 through leakage pipes 19 in which flow speed adjustment cartridges 21 having a helical external groove are inserted.

The leakage speed of the braking fluid is adjusted by means of differently grooved cartridges 21, so as to determine different rotation, and thus closing, speeds of the single petals of valve 5. More specifically, the closing speed of the petals 7 of larger size is set so as to be faster than that of the petals 6 of smaller size, which consequently overlap and partially rest on the edges of the adjacent petals 7, thus achieving the closing configuration in FIG. 4. This allows to obtain a closure which limits the release of product to the maximum when closing the control valve 5, thus limiting the pressure peak generated by the water hammer of the petroleum product to acceptable levels.

The fins 59 of the petals 6 of smaller size avoid any early closing of the petals 7 of larger size, and when housing the projections 53 of petals 7 in their recesses 60, allow an accurate placement of the petals in the tight closing position, as shown in FIG. 14.

The petals 6'-7' of the downstream control valve 5' in the flow direction of the fluid product are in turn provided with automatic closing devices, described in patent application M12010A002248, which by means of appropriate springs act on the petals 6' and 7' to determine the rotation, and thus the automatic closing of petals 6' and 7' when sleeve 4 is pulled out (FIG. 3). The braking effect is here determined by the pressurized fluid inside the joining part 2.

For units having a one-direction flow, the downstream valve may thus not be provided with a braking system but only with the automatic closing device biased by a spring.

Finally, the sealing gaskets 82 ensure an accurate, durable sealing between one petal and the other and between the inside and the outside of the connection unit for both valve 5 and for valve 5'.

The invention claimed is:

1. A control, valve for connection units for flexible hoses, comprising a plurality of petals (segments or sectors) rotatable between a position of complete opening and a position of complete closing, wherein rotatable petals having different shave and size alternate in pairs along the circumference of the connection unit, and wherein the petals of smaller size have a substantially triangular shape with straight lateral sides and a rounded end, which fluid-tightly abut against corresponding straight lateral sides and curved end of the petals of larger size when the valve is closed, wherein said lateral sides and said curved end of the petals of smaller size have a continuous cavity with a dovetail cross-section and small lateral entrance. in which a sealing gasket with a substantially circular cross-section and ends fixed in a removable manner to the remote ends of said lateral sides is housed and retained.

2. The control valve according to claim 1, wherein the fixing points of the ends of the sealing gasket are arranged near the pivoting points of the petal so that they can cooperate with a sealing ring provided on each body of the connection unit for also ensuring the sealing against possible lateral leakages of product from the interior to the exterior of the connection unit.

3. The control valve according to claim 1, wherein said housing the sealing gasket extends along an inclined surface of the petal which is contacted by a cooperating inclined surface of the adjacent petal.

4. The control valve according to claim 1, wherein the ends of said gasket are retained by squeezing between the surface of the petal and a knurled shoulder of a locking plate kept in pressed condition by a fastening screw.

5. The control valve according to claim 1, wherein the petals of larger size have a substantially triangular shape with a V-shaped end, the sides of which are intended to fluid-tightly abut against the corresponding sides of the V-shaped ends of adjacent petals of larger size, and also have straight lateral sides with a curved part provided with a laterally protruding curved step , and the petals of smaller size have in turn a substantial triangular shape with a rounded end which overlaps said curved step of the adjacent petals of larger size when the valve is closed, and laterally tightly engages said curved part of the adjacent petals of larger size, and straight lateral sides which tightly engage the straight lateral sides of the adjacent petals of larger size when the valve is closed.

\* \* \* \* \*